United States Patent
Martin

(10) Patent No.: US 10,804,563 B2
(45) Date of Patent: Oct. 13, 2020

(54) OXY-THIO-NITRIDE MIXED NETWORK FORMER SOLID ELECTROLYTES

(71) Applicant: Iowa State University Research Foundation, Inc., Ames, IA (US)

(72) Inventor: Steve W. Martin, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 15/732,036

(22) Filed: Sep. 7, 2017

(65) Prior Publication Data

US 2018/0069264 A1 Mar. 8, 2018

Related U.S. Application Data

(60) Provisional application No. 62/495,270, filed on Sep. 8, 2016.

(51) Int. Cl.
*H01M 10/0562* (2010.01)
*H01M 10/0525* (2010.01)
*H01M 10/054* (2010.01)

(52) U.S. Cl.
CPC ..... *H01M 10/0562* (2013.01); *H01M 10/054* (2013.01); *H01M 10/0525* (2013.01); *H01M 2300/0068* (2013.01); *H01M 2300/0071* (2013.01)

(58) Field of Classification Search
None
See application file for complete search history.

(56) References Cited

U.S. PATENT DOCUMENTS

| | | | | |
|---|---|---|---|---|
| 4,599,284 A | 7/1986 | Akridge | | 429/191 |
| 6,214,061 B1 | 4/2001 | Visco | | 29/623.5 |
| 6,767,662 B2 | 7/2004 | Jacobsen | | 429/30 |
| 8,182,943 B2 | 5/2012 | Visco | | 429/231.9 |
| 9,362,538 B2 | 6/2016 | Visco | | |
| 2007/0042272 A1* | 2/2007 | Ugaji | | H01B 1/122 429/322 |
| 2009/0029265 A1* | 1/2009 | Ota | | H01M 10/052 429/322 |
| 2014/0308570 A1* | 10/2014 | Gaben | | H01M 4/04 429/162 |
| 2015/0249262 A1 | 9/2015 | Wachsman | | |
| 2016/0156065 A1 | 6/2016 | Visco | | |
| 2016/0190640 A1 | 6/2016 | Visco | | |

OTHER PUBLICATIONS

Mascaraque et al. Structure and electrical properties of a new thio-phosphorus oxynitride glass electrolyte. Journal of Non-Crystalline Solids 405 (2014) 159-162 (Year: 2014).*

Dirk Larink et al, "Structure and ionic conductivity in the mixed-network former chalcogenide glass system [Na2S]⅓[(B2S3)x(P2S5)11-x]⅓", The Journal of Physical Chemistry C, 116, 22698-22707, 2012.

Christian Biscoff et al, "IR,Raman, and NMR studies of the Short Range Structures of 0.5Na2S+0.5[xGeS2+(1-x)PS5/2] Mixed Glass-Former Glasses", The Journal of Physical Chemistry B 118, 1943-1952, 2014.

Dirk Larink et al, "Mixed network former effects in telluride glass systems: Structure/property correlations in the system (Na2O)⅓[(2TeO2)x(B2O3O1-x]⅔", Journal of Non-Crystaliine Solids, 426, 150-152 , 2015.

Youngsik Kim et al, "Preparation and characterization of germanium oxy-sulfide GeS2—GeO2 glass", Journal of Non-Crystalline Solids 351, No. 24, 1973-1979, 2005.

* cited by examiner

Primary Examiner — Tanisha Diggs

(57) ABSTRACT

An ion conductivity mixed chalcogenide (e.g. oxy-sulfide), mixed network former solid electrolyte is provided for use in solid state batteries.

9 Claims, 1 Drawing Sheet

OXY-THIO-NITRIDE MIXED NETWORK FORMER SOLID ELECTROLYTES

RELATED APPLICATION

This application claims benefit and priority of provisional application Ser. No. 62/495,270 filed Sep. 8, 2016, the entire disclosure of which is incorporated herein by reference.

CONTRACTUAL ORIGIN OF THE INVENTION

The invention was made with government support under Grant Nos. DMR1304977 and CBET438223 awarded by the National Science Foundation. The government has certain rights in the invention.

FIELD OF THE INVENTION

The present invention involves ion conductive solid electrolytes.

BACKGROUND OF THE INVENTION

All-oxide solid electrolytes are poorly conducting, but they can be highly stable. Despite the many compositions and structures investigated, few have reached the $10^{-3}$ S/cm ionic conductivity threshold, FIG. 1. More critically, their low ionic conductivity arises from a high conductivity activation energy that sharply decreases the conductivity at lower temperatures, FIG. 1. All—oxide solid electrolytes have three other disadvantages: (1) their high conductivities are not achieved unless they are sintered at high temperatures; (2) their typically low ion concentrations create high interfacial impedances; and (3) they must be fabricated off-line which limits them to low-surface area, long-diffusion-length, planar 2D battery designs.

In contrast, all-sulfide solid electrolytes are very highly conducting (FIG. 1) but chemically unstable and hence expensive to manufacture. $Li^+$ ion conducting all-sulfide solid electrolytes are significantly more studied than $Na^+$ solid electrolytes. It has been shown that $Li^+$ ion conductivities as high as $10^{-2}$ S/cm at 25° C. and $10^{-3}$ S/cm at −30° C. can be obtained.

Only a few reports exist for all-sulfide $Na^+$ ion conducting solid electrolytes. The higher polarizability of the larger sulfide anion compared to the smaller oxide anion is believed to be the reason for their 100,000 times higher conductivity, and binary $Li_2S+P_2S_5$ glasses can be partially crystallized to produce glass-ceramic all-sulfide solid electrolytes with even higher conductivities. One investigator showed that $Li_{10}GeP_2S_{12}$, based on mixing the network formers (Ge and P), exhibits the highest $Li^+$ ion conductivity of any solid electrolyte reported, about $1.2\times10^{-2}$ S/cm at 25° C. $(Li/Na)^+$ analogues of these all-sulfide solid electrolytes are unexplored.

The typical $75Li_2S+25P_2S_5$ all-sulfide solid electrolyte is $Li^+$ rich with low intergranular impedances since they are 3D $Li^+$ ion conductors. They can be pressed into solid discs at modest pressures at room temperature to yield conductivities orders of magnitude higher than the all-oxide ceramics, which dramatically decreases their cost. Further, they can be prepared by highly scalable continuous batching and mechanical milling. $Li_3PS_4$ material can be produced as a high-surface-area fine-grained powder that is ideal for low-temperature low-cost solid-state battery forming operations. The near room temperature processing for all-sulfide electrolytes greatly expands the range of battery forming operations for fabricating low-cost, high-volume Li or Na batteries. All-sulfide fine-grained powder precursor electrolytes can easily take advantage of high-surface-area, short-diffusion-length, high-volume, 3D designs to dramatically increase both energy and power densities. The ASSSB (all sulfide solid state battery) design will be greatly facilitated by the low-temperature processing of these solid electrolytes to create entirely new battery designs.

However, the benefits (ultra-high conductivity and low temperature processing) of these electrolytes will be difficult to realize if their atmospheric chemical stability cannot be dramatically improved. Upon exposure to air, these materials produce hazardous $H_2S$ gas.

Class of Mixed Oxy-Sulfide Solid Electrolytes:

$Li^+$ ion conductivities of $10^{-2}$ S/cm at 25° C. for $Li_2S+GeS_2$ solid electrolytes, higher than lithium salt-doped organic liquid electrolytes have been reported. Further, dramatic increases in the $Li^+$ ion conductivity, chemical stability, and mechanical strength can all be achieved by selective "pre-oxidation" of these bulk sulfide glasses. FIG. 2A shows that 5 mole % oxygen added to a $Li_2S+GeS_2$ glass increases the $Li^+$ ion conductivity by a factor of 10, dramatically suppresses the reaction in air (FIG. 2B), and increases the glass transition temperature, Tg (FIG. 2C). Due to the dramatic increase in the $Li^+$ ion conductivity with added oxygen, the conductivity does not drop below (and the conductivity activation energy does not rise above) that of the parent all-sulfide glass until about 50 mole % of the sulfur has been replaced by oxygen; see "Anomalous Ionic Conductivity Increase in Li2S+GeS2+GeO2 Glasses", by Youngsik Kim, Jason Saienga, and Steve W. Martin, J. Phys. Chem. B, 2006, 110 (33), pp 16318-16325.

The invention involves providing a ion conducting solid electrolyte that blends the advantages of both oxide and sulfide solid electrolytes and addresses a need for an ion conducting solid-state electrolyte that meets the combined requirements of high conductivity, chemical stability, and low cost needed for high capacity, stable, and low-cost solid state batteries.

SUMMARY OF THE INVENTION

The present invention provides an ion conductive mixed chalcogenide, mixed network former solid electrolyte to this end. One embodiment provides a solid electrolyte comprising an ion conductive mixed oxy-sulfide, mixed network former solid electrolyte that can be doped with nitrogen.

An illustrative preferred embodiment of the invention involves initially making particular mixed network former glasses represented by:

$$x(\text{Li/Na/K/Rb/Cs})_2 S_u O_{1-u} + (1-x)\sum_{i=1}^{m} g_i G_i S_{c_i-z} O_z,$$

where typically $0 \le u \le 1$, $0.5 \le x \le 0.90$, m is the number of glass formers $G_i S_{ci-z} O_z$ and is typically $1 \le m \le 10$, but preferably $2 \le m \le 5$, $g_i$ is the mole fraction of each glass (network) former $G_i S_{ci-z} O_z$, and is $0 \le g_i \le 1$ and $$1 = \sum_{i=1}^{m} g_1,$$

where $c_i = v_i/2$ and $v_i$ is the formal valence of $G_i$ of each respective glass former, and $0 \leq$ each $z \leq c_i$. That is, there will be a value of z (a $z_i$ value) for each respective glass former. Illustrative $G_i$ elements include at least two different of Si, Ge, P, B, Sb, As, Sn, Ga, V, and Al among others, although two or more of Si, P, and B are preferred.

These glasses can be subjected to nitrogen-doping to yield (Li/Na)⁺ ion conductive, mixed $$x(\text{Li}/\text{Na}/\text{K}/\text{Rb}/\text{Cs})_2 S_u O_{1-u} + (1-x)\sum_{i=1}^{m} g_i G_i S_{c_i-z} O_z,$$

after ammonolysis (or other nitrogen doping treatment), yields a solid electrolyte having a general composition $$x(\text{Li}/\text{Na})_2 S_{u-1.5fp} O_{1-u-1.5(1-f)p} N_p + (1-x)\sum_{i=1}^{m} g_i G_i S_{c_i-z-1.5ft} O_{z-(1-f)1.5t} N_t,$$

where typically $0 \leq u \leq 1$, $0 \leq f \leq 1$, $0 \leq p \leq 1$, and $0 \leq t \leq 1$, $0.5 \leq x \leq 0.90$, m is the number of glass (network) formers $G_i S_{c_i-z} O_z$, and is typically $1 \leq m \leq 10$, preferably $2 \leq m \leq 5$, $g_i$ is the mole fraction of each glass former $G_i S_{c_i-z} O_z$, and is $0 \leq g_i \leq 1$ and $$1 = \sum_{i=1}^{m} g_1,,$$

where $c_i = v_i/2$ and $v_i$ is the formal valence of $G_i$ of each glass former, and $0 \leq$ each $z \leq c_i$ where there will be a value of z (a $z_i$ value) for each glass former.

Particular illustrative solid electrolyte embodiments can include, but are not limited to, $0.67\text{Li}_2\text{S}_1\text{O}_{0.85}\text{N}_{0.1} + 0.33$ [$0.25\text{B}_2\text{S}_{2.3}\text{O}_{0.55}\text{N}_{0.1} + 0.25\text{P}_2\text{S}_{4.2}\text{O}_{0.65}\text{N}_{0.1} + 0.25\text{SiS}_{1.5}\text{O}_{0.35}\text{N}_{0.1} + 0.25\text{GeS}_{1.4}\text{O}_{0.45}\text{N}_{0.1}$] or $0.70\text{Na}_2\text{S}_{0.6}\text{O}_{0.25}\text{N}_{0.1} + 0.30[0.5\text{B}_2\text{S}_{2.5}\text{O}_{0.35}\text{N}_{0.1} + 0.5\text{P}_2\text{S}_{4.0}\text{O}_{0.85}\text{N}_{0.1}]$.

In these compositions, alkaline earth metal ions, such as $\text{Mg}^{+2}$ and/or $\text{Ca}^{+2}$ ions, can be used in lieu of or in addition to alkali cations, x=Li⁺, Na⁺, K⁺, Rb⁺, and Cs⁺ as conductors.

In another embodiment, the present invention provides a method of making a solid electrolyte comprising melting a mixed chalcogenide, mixed network former glass and contacting the melted glass with a nitrogen source for a time to dope the glass with nitrogen.

The present invention provides a new class of solid electrolytes that may be simultaneously highly conducting, electrochemically stable, atmospherically stable, thermally stable, and mechanically strong, yet also easy and low cost to prepare and that may provide a significant key opportunity to break the existing paradigm of low conductivity/chemically stable, high conductivity/unstable.

DETAILED DESCRIPTION OF THE INVENTION

Figure 1:
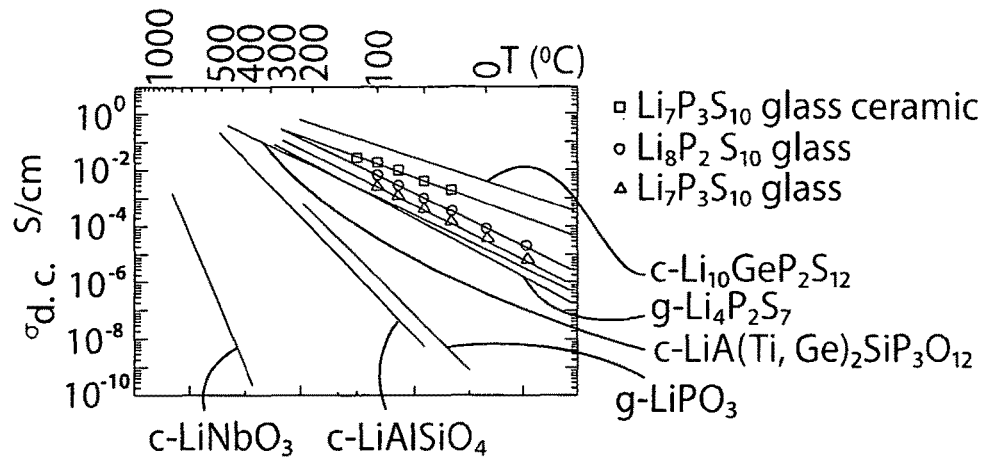
FIG. 1 shows Arrhenius plots of low conductivity and high activation energy oxide solid electrolytes compared to high conductivity and low activation energy sulfide solid electrolytes.

The present invention provides ion conductive mixed oxy-sulfide-nitride, mixed network former solid electrolytes wherein the following examples are offered to further illustrate the invention, but not limit the scope thereof. Conductivity of the solid electrolytes can be provided by at least one of the alkali cations, Li⁺, Na⁺, K⁺, Rb⁺, and Cs⁺ as conductors, although at least one of the alkaline earth metal ions, such as $\text{Mg}^{+2}$ and/or $\text{Ca}^{+2}$ ions, can be used in lieu of or in addition to alkali cations as conductors.

The following examples are offered to further illustrate, but not limit, the invention.

Mixed Oxy-Sulfide, Mixed Network Former Solid Electrolytes:

Glasses were prepared and are represented by:

$$x(\text{Li}/\text{Na}/\text{K}/\text{Rb}/\text{Cs})_2 S_u O_{1-u} + (1-x)\sum_{i=1}^{m} g_i G_i S_{c_i-z} O_z$$

glasses, where typically $0 \leq u \leq 1$, $0.5 \leq x \leq 90$, m is the number of glass formers $G_i S_{c_i-z} O_z$ and is typically $1 \leq m \leq 10$, preferably $2 \leq m \leq 5$, $g_i$ is the mole fraction of each glass (network) former $G_i S_{c_i-z} O_z$, and is $0 \leq g_i \leq 1$ and $$1 = \sum_{i=1}^{m} g_1,$$

where $c_i = v_i/2$ and $v_i$ is the formal valence of $G_i$ of each glass former, and $0 \leq$ each $z \leq c_i$ where there will be a value of z (a $z_i$ value) for each glass former. For example, illustrative Li/Na glasses can be represented by:

$$x(\text{Li}/\text{Na})_2 S_u O_{1-u} + (1-x)\sum_{i=1}^{m} g_i G_i S_{c_i-z_i} O_{z_i}.$$

In addition to glasses represented by the above formula, non-stoichiometric variations from the above formula are included within the scope of the invention. These non-stoichiometric variations in composition result when typically more or less glass former $G_i$ is added to the glass composition or when more or less sulfur (S) and/or oxygen (O) is added to the composition and this creates ratios of the glass former $G_i$ to S and/or O different than the typical valence of the glass formers $G_i$ would predict. For example, when the glass former $G_i$ is Si, and has a valence of typically +4, the normally expected ratio of glass former to S or O, would be 1 to 2. However, additional S can be added to the composition, or equivalently, less Si can be added to the composition to give S rich off stoichiometric ratios such as 1 to 1, 1 to 1.5, or any other ratio.

In addition to the mixed oxy-sulfide glasses represented by the formulas above, it is envisioned that there can be any other combination of the chalcogenide elements, S, Se, and Te, with O and/or any of the other chalcogens to produce mixed chalcogenide, mixed network former glasses. For example, a simple extension of the formula above for any combination of chalcogen elements would be

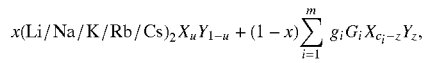

where X and Y are two different chalcogenide elements selected from the list O, S, Se and Te. It is a further extension of this formula to recognize that there are glasses where there are two, three, and four mixed chalcogen elements in the formula, such as

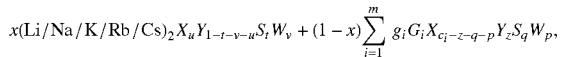

where X, Y, S and W are different chalcogen elements selected from group of chalcogen elements, O, S, Se, and Te.

It is further envisioned that there are can be any combination of off-stoichiometric mixed glass former mixed chalcogen glass compositions as described above.

It is still further envisioned, that while there may be preferred compositions that contain glass formers $G_i$, the term glass former $G_i$ in the compositional formulas described above and below is not meant to restrict the claimed compositions to only those compounds based on elements $G_i$ (both stoichiometric and non-stoichiometric) that are known to be glass formers themselves such as $GeS_2$ and $B_2S_3$ among many others. The term $G_i$ can also include other compounds (both stoichiometric and non-stoichiometric) that are not glass forming on their own. For example, $G_i$ could be selected from many different elements such as Al, Ga, La, Zr, In and many others that are known to help improve the properties of glass. A typical, but not necessarily limiting criteria is that these other $G_i$ elements are called glass intermediates.

In the above formula, "x" can be at least one of the alkali cations selected from $Li^+$, $Na^+$, $K^+$, $Rb^+$, and $Cs^+$, although at least one of alkaline earth metal ions, such as $Mg^{+2}$ and/or $Ca^{+2}$ ions, can be used in the formula in lieu of or in addition to the alkali cation(s).

Figure 2A:
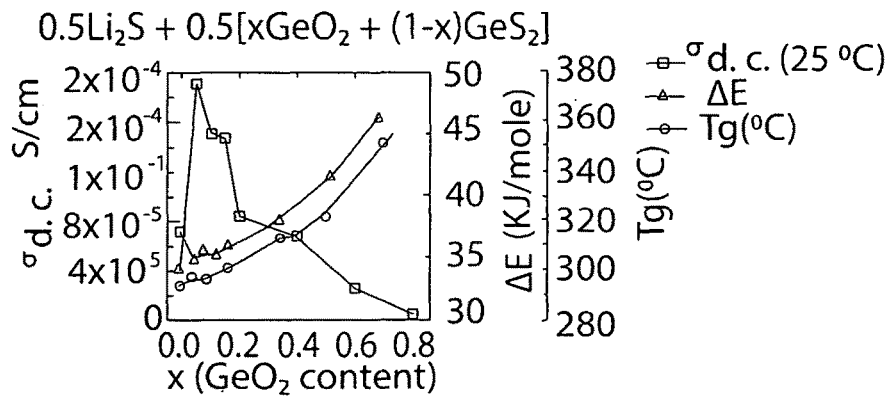
FIG. 2A shows conductivities, activation energies, and $T_g$ values of mixed oxy-sulfide $0.5\text{Li}_2\text{S} + 0.5[x\text{GeO}_2 + (1-x)\text{GeS}_2]$ solid electrolytes.
Figure 2B:
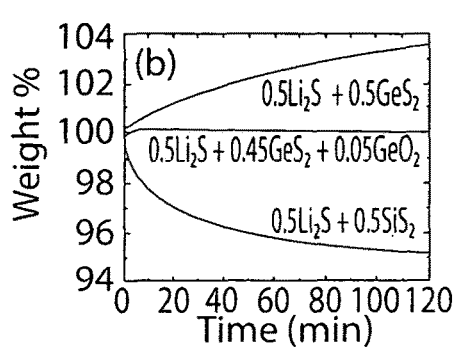
FIG. 2B shows TGA scans of two unstable pure sulfide solid electrolytes compared to the very stable mixed oxysulfide solid electrolyte.
Figure 2C:
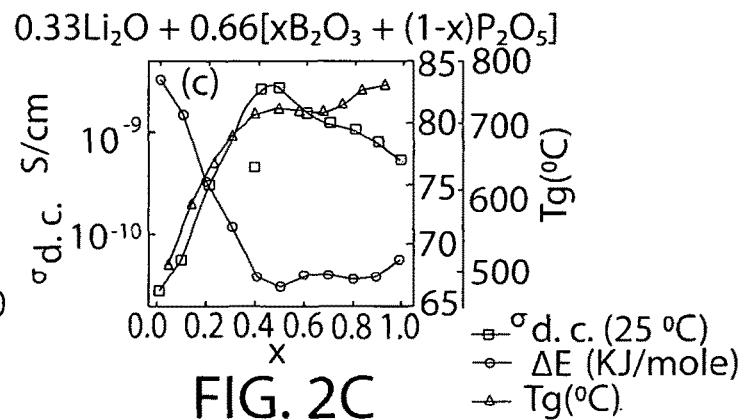
FIG. 2C shows conductivities, activation energies, and $T_g$ values for mixed network former all-oxide $0.33\text{Li}_2\text{O} + [x\text{B}_2\text{O}_3 + (1-x)\text{P}_2\text{O}_5]$ solid electrolytes, showing that a dramatic, nearly 100-fold increase in the conductivity can be achieved by mixing network formers, P for B.

As illustrative compositions, the above glasses would yield a particular glass composition such as $0.67Li_2S_{0.5}O_{0.5}+0.33[0.25B_2S_{2.5}O_{0.5}+0.25P_2S_{4.5}O_{0.5}+0.25SiS_{1.67}O_{0.33}+0.25GeS_{1.5}O_{0.5}]$ or such as $0.70Na_2S_{0.67}O_{0.33}+0.30[0.5B_2S_{2.7}O_{0.3}+0.5P_2S_{4.2}O_{0.8}]$. These values span the range of the conductivity maximum, FIG. 2C.

In a typical illustrative synthesis procedure, appropriate amounts of high purity $Li_2S$, $Li_2O$, $Na_2S$, $Na_2O$, $B_2S_3$, $B_2O_3$, $P_2S_5$, $P_2O_5$, $SiO_2$, $SiS_2$, $GeS_2$, and/or $GeO_2$ for a typical batch of up to 200 grams or more yielding a general composition of $x(Li/Na)_2S+(1-x)[zB_2S_{3-x}O_x+(1-z)P_2S_{5-y}O_y]$, are milled using a Spex vibratory mill inside a high quality state-of-the-art glove box (MBraun), with typically 2 ppm $O_2$ and $H_2O$. This batch is then transferred to a hermetically sealed $ZrO_2$ pot and lid with $ZrO_2$ milling media. It is planetary milled or similarly milled for up to or exceeding about 20 hrs at room temperature or heated using a planetary mill or equivalent. The resulting fine-grained glass, semi-crystalline ceramic, partially crystalline ceramic, or a crystalline ceramic solid material will be collected inside the glove box.

Alternatively, these same batch materials can be weighed out in the correct proportions as above to yield a glass batch as described above, and then hand milled or otherwise mixed and/or agitated to create an evenly mixed mixture. This mixture is then melted in a crucible in a furnace at a temperature appropriate to melt the mixed ingredients to a homogeneous liquid. This liquid is then quenched to room temperature at a cooling rate to yield a glass, semi-crystalline ceramic, partially crystalline ceramic, or a crystalline ceramic solid.

High Ion Conductivity Mixed Oxy-Sulfide-Nitride, Mixed Network Former Solid Electrolytes:

The above compositions can be doped with N using ammonolysis by reacting the melt of the glass with gaseous ammonia such as $NH_3$, sputtering a target made of the base composition in a gas atmosphere containing nitrogen (N), and/or melted with other nitride compounds of those described above. In an illustrative process, a mixed oxy-sulfide mixed glass former glass is held in the liquid state above the melting point of the phase and $NH_3$ is passed over the melt. N is incorporated into the melt by displacing O and S and liberating $H_2O$ and $H_2S$ which will be passed through a chemical (Li/Na)OH and $H_2O_2$ scrubber before exiting into a chemical fume hood. The reaction is $3O^{2-}(glass)+2NH_3 \rightarrow 2N^{3-}(glass)+3H_2O\uparrow$ and $3S^{2-}(glass)+2NH_3 \rightarrow 2N^{3-}(glass)+3H_2S\uparrow$.

In a typical illustrative synthesis, a fine powder of the lithium or sodium oxy-sulfide mixed network former glass,

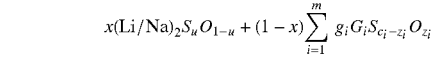

is placed into a high surface area graphite boat, and then placed into a muffle tube inside a tube furnace which has both ends sealed except for a gas inlet and a gas outlet. The muffle tube is purged at room temperature with pure $N_2$ until a very low partial pressure of $O_2$ is achieved (<100 ppm) inside the muffle tube. Then the furnace temperature is ramped up slowly to above the glass melt temperature, typically in the range of $400 \leq T \leq 800°$ C. The $N_2$ flow gas is then switched to $NH_3$ gas flow (low ppm $H_2O$) and the glass melt is nitrided for 3 hours. The $N_2$ and $NH_3$ flow rates are typically in the range of 10 to 1,000 mL/hour. The $NH_3$ is then switched off and the $N_2$ is then turned back on to purge the muffle tube of the remaining $NH_3$ and the furnace is cooled back to room temperature. The $NH_3$ exiting the muffle tube is safely purged from the system through a $NaOH+H_2O_2$ gettering solution. After a series of runs, the gettering solution is safely neutralized by adding $HNO_3$. The resulting glass of about 200-500 grams of nitrided materials is collected from the graphite boat and milled to a fine powder for future use and characterization. Due to charge balance considerations, the N goes into the glass melt as a $N^{3-}$ anion and it replaces both $O^{2-}$ and $S^{2-}$ anions. Hence, the for every 1 $N^{3-}$ anion introduced into the glass melt a combination of $1.5(fO^{2-}+(1-f)S^{2-})$ anions are removed from the melt in the form of $H_2O$ and $H_2S$. These reactions are given above.

Therefore, for the base mixed oxy-sulfide, mixed glass former composition describe above,

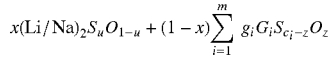

ammonolysis (or other N doping treatment) yields a solid electrolyte pursuant to the invention having a general composition:

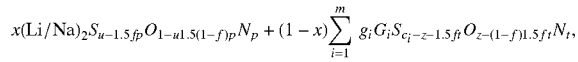

where typically $0 \leq u \leq 1$, $0 \leq f \leq 1$, $0 \leq p \leq 1$, and $0 \leq t \leq 1$, $0.5 \leq x \leq 0.90$, m is the number of glass (network) formers and is typically $1 \leq m \leq 10$, but more typically $2 \leq m \leq 5$, $g_i$ is the mole fraction of each glass (network) former $G_i S_{c_i-z} O_z$, and is $0 \leq g_i \leq 1$, where $c_i = v_i/2$ and $v_i$ is the formal valence of each respective $G_i$, and $0 \leq$ each $z \leq c_i$ as described above.

This general solid electrolyte composition would yield illustrative solid electrolytes such as: $0.67Li_2S_1O_{0.85}N_{0.1} + 0.33[0.25B_2S_{2.3}O_{0.55}N_{0.1} + 0.25P_2S_{4.2}O_{0.65}N_{0.1} + 0.25SiS_{1.5}O_{0.35}N_{0.1} + 0.25GeS_{1.4}O_{0.45}N_{0.1}]$ or $0.70Na_2S_{0.6}O_{0.25}N_{0.1} + 0.30[0.5B_2S_{2.5}O_{0.35}N_{0.1} + 0.5P_2S_{4.0}O_{0.85}N_{0.1}]$ In these compositions, alkaline earth metal ions, such as $Mg^{+2}$ and/or $Ca^{+2}$ ions, can be used in lieu of or in addition to $Li^+/Na^+$ as conductors.

The following Examples are offered to further illustrate but not limit embodiments of the present invention:
Na Ion-Conductive Oxy-Sulfide, Mixed Network Former Glasses:
A) Mixed oxy-sulfide, mixed network former glasses represented by $0.67Na_2S + 0.33[(0.5)P_2S_{(5-z)}O_z + (0.5)B_2S_{3-z}O_z]$ wherein z was 0.5, 1.25, 1.65, and 2.5 and any values between 0 and 3 for B and between 0 and 5 for P were prepared by the milling technique or the melting technique described above. The glasses were found to be conductive to $Na^+$ ions at 30° C. and 60° C. in conductivity testing using a common complex impedance type of conductivity test. These glasses can be subjected to nitriding as described above to dope them with nitrogen as described above.
B) Mixed oxy-sulfide, mixed network former glasses represented by 0.70% $Na_2S$ + 0.25% $SiS_2$ + 0.04% $P_2S_5$ + 0.01% $P_2O_5$ where % are mole %'s. The glasses were prepared by the milling technique or the melting technique described above. The glasses were found to be conductive to $Na^+$ ions at 30° C. and 60° C. using the complex impedance conductivity test. These glasses can be subjected to nitriding as described above to dope them with nitrogen as described above.
C) Mixed oxy-sulfide, mixed network former glasses represented alternately by 0.70% $Na_2S$ + 0.25% $SiS_2$ + 0.03% $P_2S_5$ + 0.02% $P_2O_5$ where % are mole %'s were prepared by the milling technique or the melting technique described. The glasses were found to be conductive to $Na^+$ ions at 25° C. and 60° C. using the complex impedance conductivity test. These glasses can be subjected to nitriding as described above to dope them with nitrogen as described above.

A class of solid electrolytes is provided that can be simultaneously ion conducting, electrochemically stable, atmospherically stable, thermally stable, and mechanically strong, yet also easy and low cost to prepare and that may provide a significant key opportunity to break the existing paradigm of low conductivity/chemically stable, high conductivity/unstable.

Although the present invention has been described with respect to particular illustrative embodiments, those skilled in the art will appreciate that modifications and changes can be made thereto without departing from the spirit and scope of the invention as set forth in the appended claims.

I claim:

1. A solid electrolyte, comprising a mixed oxy-sulfide glass structural network that includes silicon oxy-sulfide and at least one other oxy-sulfide, wherein the network includes cations comprising at least one of Li, Na, K, Cs and Rb and further includes nitrogen, wherein the structural network also includes at least one of Se and Te.

2. The electrolyte of claim 1 wherein the other oxy-sulfide includes at least one of phosphorous oxy-sulfide and boron oxy-sulfide.

3. A solid electrolyte, comprising a glass composition represented by:

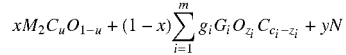

where M is at least one of an alkali metal selected from the group consisting of Li, Na, K, Rb, and Cs, C is a chalcogenide element and is at least one of S, Se, and Te, $0 \leq u \leq 1.0$, $0 < x < 1.0$, m is the number of oxy-chalcogenides $G_i O_{z_i} C_{e_i-z_i}$ and is $1 \leq m \leq 10$, $g_i$ is the mole fraction of each respective oxy-chalcogenide among all of the oxy-chalcogenides, and is $0 \leq g_i \leq 1$ and

where $c_i = v_i/2$ and $v_i$ is the formal valence of the $G_i$ element of each respective oxy-chalcogenide, and for each $z_i$, $0 < z_i < c_j$ and where the $G_i$ element is selected from the group consisting of Si, Ge, P, B, Sb, As, Sn, Ga, V, and Al,
wherein at least one oxy-chalcogenide, $G_i O_{z_i} C_{e_i-z_i}$, that comprises silicon oxy-chalcogenide is present for $1 \leq m \leq 10$, and
wherein the solid electrolyte includes a nitrogen content yN that replaces an amount greater than 0 but less than 3/2 of the sum of the oxygen plus the C chalcogenides of the glass composition.

4. The electrolyte of claim 3 wherein $2 \leq m \leq 5$.

5. The electrolyte of claim 4 wherein for $2 \leq m \leq 5$, at least one other oxy-chalcogenide comprising at least one of phosphorous oxy-chalcogenide and boron oxy-chalcogenide is present.

6. A solid state battery comprising the solid electrolyte of claim 3.

7. A method of making a solid electrolyte of claim 3 comprising:
melting a mixed chalcogenide, mixed network former glass to form a melted glass and contacting the melted glass with a nitrogen source for a time to dope the melted glass with nitrogen.

8. The method of claim 7 wherein the melted glass is contacted with ammonia gas.

9. The method of claim 7 including pulverizing the solid electrolyte to particulates.

* * * * *

UNITED STATES PATENT AND TRADEMARK OFFICE
CERTIFICATE OF CORRECTION

PATENT NO. : 10,804,563 B2
APPLICATION NO. : 15/732036
DATED : October 13, 2020
INVENTOR(S) : Steve W. Martin Page 1 of 1

It is certified that error appears in the above-identified patent and that said Letters Patent is hereby corrected as shown below:

In the Specification

Column 1, Lines 10-15, should read:
-- CONTRACTUAL ORIGIN OF THE INVENTION
The invention was made with government support under Grant Nos. DMR1304977 and CBET438223 awarded by the National Science Foundation and under Grant No. DE-AR000078 awarded by the Department of Energy. The government has certain rights in the invention. --

Signed and Sealed this
Ninth Day of August, 2022

Katherine Kelly Vidal
*Director of the United States Patent and Trademark Office*